US011435711B2

(12) United States Patent
Yum et al.

(10) Patent No.: US 11,435,711 B2
(45) Date of Patent: *Sep. 6, 2022

(54) STORAGE DEVICE AND TEMPERATURE CONTROL UTILIZING A SINGLE BIT IN COMMUNICATION WITH A HOST

(71) Applicant: SAMSUNG ELECTRONICS CO., LTD., Suwon-si (KR)

(72) Inventors: Ho-Suk Yum, Yongin-si (KR); Heechang Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

This patent is subject to a terminal disclaimer.

(21) Appl. No.: 17/000,914

(22) Filed: Aug. 24, 2020

(65) Prior Publication Data

US 2020/0387126 A1    Dec. 10, 2020

Related U.S. Application Data

(63) Continuation of application No. 16/043,222, filed on Jul. 24, 2018, now Pat. No. 10,761,501.

(30) Foreign Application Priority Data

Jul. 24, 2017  (KR) .................. 10-2017-0093757
Jan.  5, 2018  (KR) .................. 10-2018-0001938

(51) Int. Cl.
*G06F 1/20*       (2006.01)
*G05B 19/042*   (2006.01)

(52) U.S. Cl.
CPC .......... *G05B 19/042* (2013.01); *G06F 1/206* (2013.01); *G05B 2219/21156* (2013.01)

(58) Field of Classification Search
CPC ....................................................... G06F 1/206
USPC ..................................................... 700/300
See application file for complete search history.

(56) References Cited

U.S. PATENT DOCUMENTS

| | | | |
|---|---|---|---|
| 7,400,945 | B2 | 7/2008 | Radhakrishman et al. |
| 7,496,778 | B2 | 2/2009 | Burton |
| 8,322,922 | B2 | 12/2012 | Lee et al. |
| 8,694,719 | B2 | 4/2014 | Lassa et al. |
| 9,006,000 | B2 | 4/2015 | Hanan et al. |
| 9,343,121 | B2 | 5/2016 | Jang et al. |
| 9,396,755 | B2 | 7/2016 | Budiman et al. |
| 9,684,457 | B2 | 6/2017 | Rangarajan et al. |
| 10,021,777 | B2 | 7/2018 | Stoev et al. |
| 10,175,887 | B2 | 1/2019 | Kanno |
| 10,209,894 | B2 | 2/2019 | Kanno |

(Continued)

FOREIGN PATENT DOCUMENTS

| | | |
|---|---|---|
| CN | 1338153 A | 2/2002 |
| CN | 102163452 A | 8/2011 |

(Continued)

*Primary Examiner* — Suresh Suryawanshi
(74) *Attorney, Agent, or Firm* — Volentine, Whitt & Francos, PLLC (57) ABSTRACT

An electronic device, which includes a host, and a storage device receiving a command from the host. The storage device processes the received command and returns, to the host, a command response indicating a result of processing the received command, and the command response includes information about an internal temperature of the storage device.

22 Claims, 8 Drawing Sheets

(56) References Cited

U.S. PATENT DOCUMENTS

| | | |
|---|---|---|
| 2009/0171513 A1 | 7/2009 | Tsukazawa |
| 2011/0205826 A1 | 8/2011 | Kuroda |
| 2012/0271482 A1 | 10/2012 | Tsukazawa |
| 2013/0295697 A1 | 11/2013 | Hanan et al. |
| 2014/0012445 A1 | 1/2014 | Fleckenstein et al. |
| 2014/0233132 A1 | 8/2014 | Budiman et al. |
| 2014/0306749 A1 | 10/2014 | Tanaka |
| 2015/0185951 A1* | 7/2015 | Akai ............... G06F 3/0418 345/174 |
| 2015/0301744 A1 | 10/2015 | Kim et al. |
| 2016/0062421 A1 | 3/2016 | Sugawara et al. |
| 2016/0224011 A1 | 8/2016 | Dykes |
| 2016/0306592 A1* | 10/2016 | Oh ..................... G11C 7/1045 |
| 2016/0342328 A1 | 11/2016 | Rangarajan et al. |
| 2017/0200492 A1 | 1/2017 | Hibner et al. |
| 2017/0052551 A1* | 2/2017 | Bang ................ G05B 15/02 |
| 2017/0089292 A1 | 3/2017 | Nishida et al. |
| 2017/0132169 A1 | 5/2017 | Nelogal et al. |
| 2017/0177044 A1 | 6/2017 | Limaye |
| 2017/0177218 A1 | 6/2017 | Kanno |
| 2017/0249091 A1 | 8/2017 | Hodes et al. |
| 2017/0255389 A1 | 9/2017 | Tan |
| 2017/0345510 A1* | 11/2017 | Achtenberg ........... G11C 29/52 |
| 2018/0260152 A1 | 9/2018 | Bar et al. |
| 2018/0349243 A1 | 12/2018 | Shin et al. |
| 2019/0043566 A1 | 2/2019 | Wu et al. |
| 2019/0146706 A1 | 5/2019 | Algie et al. |
| 2019/0155538 A1 | 5/2019 | Kim et al. |
| 2019/0267034 A1 | 8/2019 | Bui et al. |

FOREIGN PATENT DOCUMENTS

| | | | |
|---|---|---|---|
| CN | 103329340 A | 9/2013 | |
| CN | 104040312 A | 9/2014 | |
| CN | 106555689 A | 4/2017 | |
| DE | 102015114592 A1 * | 3/2016 | ............... G11C 7/04 |
| KR | 10-1559906 B1 | 10/2015 | |

* cited by examiner

STORAGE DEVICE AND TEMPERATURE CONTROL UTILIZING A SINGLE BIT IN COMMUNICATION WITH A HOST

CROSS-REFERENCE TO RELATED APPLICATIONS

This is a Continuation of U.S. application Ser. No. 16/043,222, filed Jul. 24, 2018, which issued as U.S. Pat. No. 10,761,501 on Sep. 1, 2020, and a claim for priority under 35 U.S.C. § 119 is made to Korean Patent Application No. 10-2017-0093757 filed Jul. 24, 2017, in the Korean Intellectual Property Office, and Korean Patent Application No. 10-2018-0001938 filed Jan. 5, 2018, in the Korean Intellectual Property Office, the entire contents of which are hereby incorporated by reference.

BACKGROUND

The present disclosure relates to an electronic device, and more particularly to temperature control of an electronic device including a storage device.

Currently, infotainment systems are widely used in vehicles. Typically, various application programs may be driven in vehicle infotainment systems. Various kinds of electronic devices in vehicle infotainment systems may include semiconductor devices such as working memory (e.g., dynamic random access memory (DRAM)), non-volatile memory, and application processors for the purpose of driving various applications.

However, a sharp increase or decrease in temperature of a semiconductor device may influence performance and reliability of the semiconductor device. In particular, when the temperature of a semiconductor device installed in a vehicle is out of a reference temperature range, the semiconductor device may operate abnormally, possibly causing serious danger during operation of the vehicle.

SUMMARY

Embodiments of the inventive concepts provide a storage device for sending information about a measured temperature to a host.

Embodiments of the inventive concepts provide an electronic device including a host, and a storage device configured to receive a command from the host. The storage device is configured to process the received command, and may send to the host a command response indicating a result of processing the received command. The command response includes information about an internal temperature of the storage device.

An embodiment of the inventive concepts further provide a storage device including a non-volatile memory device configured to store data, and a controller configured to receive a command associated with the data from a host. The controller is configured to process the received command, and send to the host a command response indicating a result of processing the received command. The command response includes information about an internal temperature of the storage device.

Embodiments of the inventive concepts still further provide a storage device including a non-volatile memory device configured to store data; and a controller configured to receive a command associated with the data from an application processor, process the received command, and send to the application processor a command response indicating a result of processing the received command. The non-volatile memory device and the controller are configured for installation in a vehicle. The controller includes a register configured to manage a reference temperature range of the storage device, and a sensor configured to measure an internal temperature of the storage device. The command response includes information about whether the internal temperature measured by the sensor is out of the reference temperature range.

BRIEF DESCRIPTION OF THE FIGURES

The above and other objects and features of the inventive concepts will become apparent in view of the following description made with reference to the accompanying drawings.

DETAILED DESCRIPTION

Below, embodiments of the inventive concepts will be described in detail and clearly to such an extent that those (hereinafter referred to as "ordinary those") skilled in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
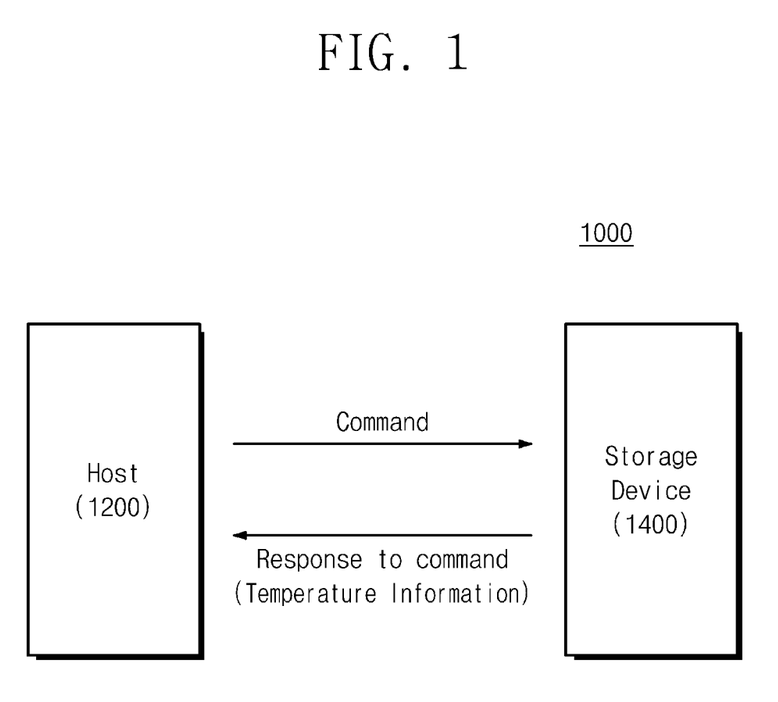
FIG. 1 illustrates a block diagram of an electronic device according to an embodiment of the inventive concepts.

FIG. 1 illustrates a block diagram of an electronic device according to an embodiment of the inventive concepts.

Electronic device 1000 may store data, may manage the stored data, and may provide necessary information to a user. According to an embodiment, the electronic device 1000 may be a device included in an infotainment system for a vehicle. For example, the vehicle may be an automobile, but is not limited thereto and may be other types of vehicles. The electronic device 1000 may be for example a navigation device or a media content player. For example, the electronic device 1000 may be a device for advanced driver assistance systems (ADAS). According to another embodiment, the electronic device 1000 may be a personal computer, or a mobile electronic device such as, but not limited to, a notebook computer, a mobile phone, personal digital assistant (PDA), a camera or the like.

The electronic device 1000 as shown in FIG. 1 includes host 1200 and storage device 1400. The electronic device may include additional circuitry and/or components not shown.

The host 1200 may provide various services to the user of the host 1200 as one or more electronic circuits/chips/devices operate. The host 1200 according to an embodiment may perform various operations for the purpose of processing commands received from the user of the host 1200 and may provide the operation results to the user of the host 1200. The host 1200 according to an embodiment may include an operating system(s), an application(s), and the like. The host 1200 according to an embodiment may include an operation processor(s) (e.g., a central processing unit (CPU), a graphic processing unit (GPU), an application processor (AP), and the like) including dedicated logic circuits (e.g., field programmable gate arrays (FPGAs), application specific integrated circuits (ASICs), and the like).

The storage device 1400 may store data. According to an embodiment, the storage device 1400 may be for example an embedded multimedia card (eMMC), universal flash storage (UFS), a solid state drive (SSD) or the like.

The storage device 1400 may be installed in a vehicle. In this case, the storage device 1400 may store various data necessary for vehicle driving. According to an embodiment, the storage device 1400 may for example store data associated with media content, map data, and data (e.g., sensor data) associated with the safety of a vehicle. The storage device 1400 may include a nonvolatile memory for storing data. For example, the storage device 1400 may include a plurality of flash memories.

To request the storage device 1400 to perform various operations, the host 1200 may transmit various commands (i.e., Command in FIG. 1) to the storage device 1400. A data-associated command that the storage device 1400 receives from the host 1200 may include, but is not limited to, a read, write, or erase command for data. The storage device 1400 may perform a read operation, a write operation or an erase operation associated with data stored or to be stored in the storage device 1400 responsive to a command from the host 1200.

A command that is transmitted from the host 1200 to the storage device 1400 may be received by a controller (not illustrated) of the storage device 1400. The controller may perform an operation corresponding to a received request, and may return (send) a response (hereinafter referred to as a "command response") to the received command to the host 1200. The command response (i.e., Response to command in FIG. 1) returned to the host 1200 may indicate the result of processing the received command. For example, the command response to the received command may include information about whether the received command is successfully processed.

The host 1200 according to an embodiment may transmit a read command (e.g., a get or read command) associated with data to the storage device 1400, and the storage device 1400 may process the received read command and may return the command response to the host 1200.

The host 1200 according to an embodiment may transmit a write command (e.g., a put or write command) associated with data to the storage device 1400, and the storage device 1400 may process the received write command and may return the command response to the host 1200.

The host 1200 according to an embodiment may transmit a delete command (e.g., a delete, unmap, or erase command) associated with data to the storage device 1400, and the storage device 1400 may process the received delete command and may return the command response to the host 1200.

The storage device 1400 may transmit temperature information to the host 1200 by additionally including temperature information in the command response to be returned to the host 1200. When a temperature of the storage device 1400 is out of a reference temperature range, an operation of the storage device 1400 or the reliability of data cannot be secured. The storage device 1400 may prevent an unexpected error capable of occurring, by transmitting its own temperature information to the host 1200 in advance.

The temperature information may be information about an internal temperature of the storage device 1400. The internal temperature of the storage device 1400 may be different from a temperature of air around the storage device 1400 or a temperature of the exterior of the storage device 1400. For example, the internal temperature of the storage device 1400 may mean a temperature of a non-volatile memory device within the storage device 1400.

The temperature information according to an embodiment may include information about whether the internal temperature of the storage device 1400 is out of a reference temperature range. For example, the temperature information may include information about whether an internal temperature measured by a sensor included in the storage device 1400 is lower than a lower limit reference temperature (e.g., a second reference temperature) and/or information about whether the internal temperature measured by the sensor is higher than an upper limit reference temperature (e.g., a first reference temperature).

The reference temperature range means a temperature range where the storage device 1400 operates stably and normally without causing an error (or without an abnormal operation). The reference temperature range according to an embodiment may for example be determined in compliance with the AEC (Automotive Electronics Council) standard being the semiconductor reliability test standard for a vehicle. For example, according to the AEC standard Grade 3, the reference temperature range may be determined to be −40° C. to 85° C.

The temperature information may be included in the command response to be transmitted from the storage device 1400 to the host 1200. For example, the storage device 1400 may process a write command received from the host 1200 and may return, to the host 1200, the command response indicating the result of processing the write command. In this case, the storage device 1400 may record (i.e., include) the temperature information in the command response. For example, in the case where the command response transmitted to the host 1200 is in the form of a bit string, information about whether the internal temperature of the storage device 1400 is lower than the lower limit reference temperature and information about whether the internal temperature of the storage device 1400 is higher than the upper limit reference temperature may be respectively expressed by using bit values.

The host 1200 may perform a thermal throttling operation for controlling the internal temperature of the storage device 1400, based on the temperature information received from the storage device 1400. For example, when the internal temperature of the storage device 1400 is determined to be out of the reference temperature range, the host 1200 may perform various control operations for adjusting the internal temperature of the storage device 1400. The thermal throttling operation will be more fully described later.

Figure 2:
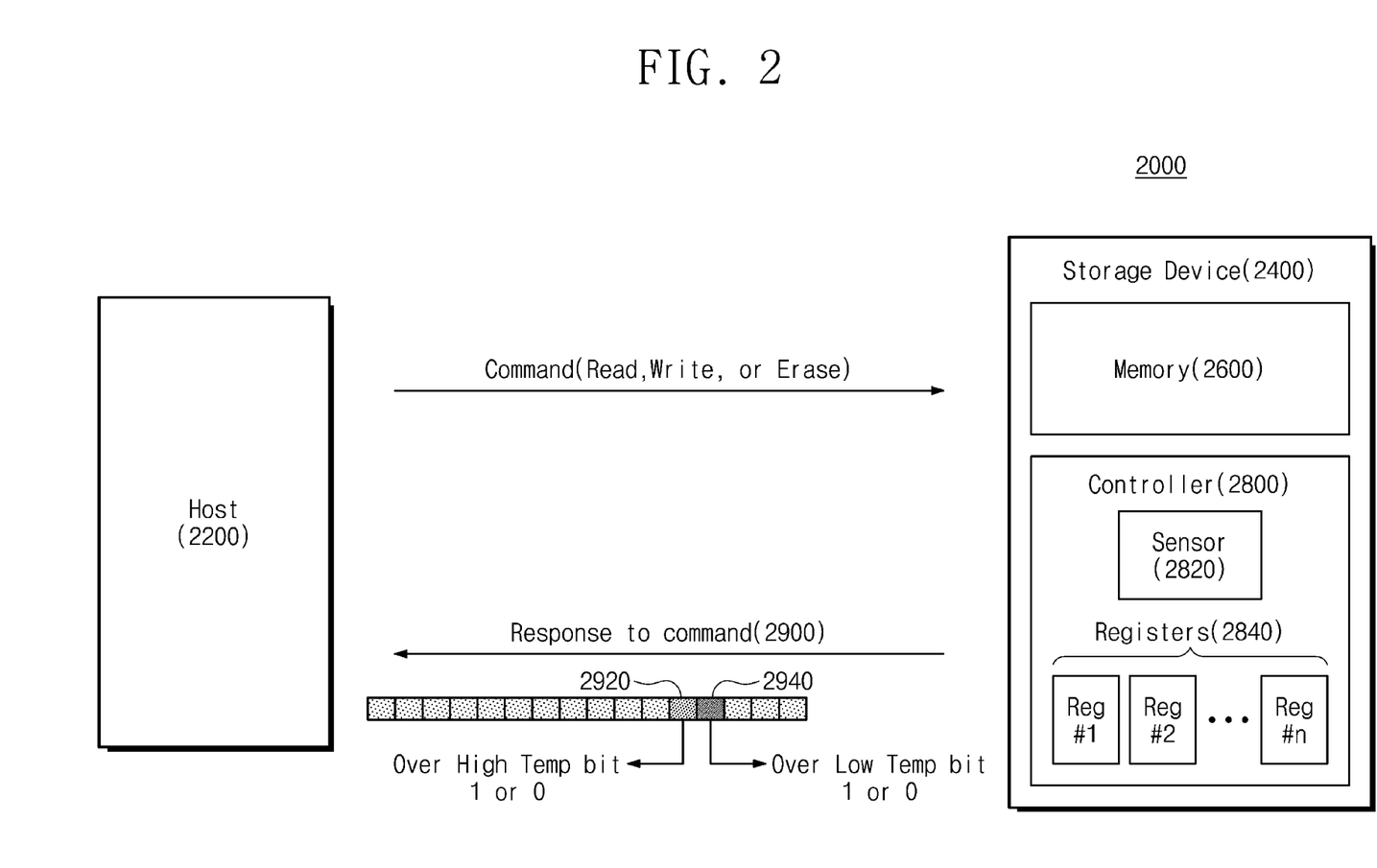
FIG. 2 illustrates a detailed block diagram of the electronic device according to an embodiment of the inventive concepts.

FIG. 2 illustrates a block diagram of an electronic device according to an embodiment of the inventive concepts.

An electronic device 2000 of FIG. 2 is a detailed embodiment of the electronic device 1000 of FIG. 1. Accordingly, the description given with reference to the electronic device 1000 of FIG. 1 may also be applied to the electronic device 2000 of FIG. 2. For example, a host 2200 and a storage device 2400 of FIG. 2 may correspond to the host 1200 and the storage device 1400 of FIG. 1, respectively.

The storage device 2400 includes a memory device (memory) 2600 and a controller 2800.

The memory device 2600 may include a non-volatile memory for storing data. For example, the memory device 2600 may include a plurality of flash memories. Alternatively, the memory device 2600 may include other kinds of non-volatile memories such as phase-change RAM (PRAM), ferrroelectric RAM (FRAM), and magnetoresistive RAM (MRAM) or the like.

The controller 2800 may receive a command associated with data from the host 2200 and may perform various operations in response to the received command. The controller 2800 may process a command and may return, to the host 2200, a command response 2900 indicating the result of processing the command.

The controller 2800 may control overall operations of the storage device 2400. For example, the controller 2800 may schedule operations of the memory device 2600 or may encode and decode signals/data to be processed in the storage device 2400. For example, the controller 2800 may control the memory device 2600 to allow the memory device 2600 to store or output data.

The controller 2800 may be connected with the memory device 2600 through a plurality of channels (not illustrated). The controller 2800 may include hardware or software devices (not illustrated) for performing operations in response to various requests from the host 2200. The controller 2800 according to an embodiment may include volatile memory (not illustrated) such as dynamic random access memory (DRAM), static random access memory (SRAM), or synchronous DRAM (SDRAM), or the like.

The controller 2800 may include one or more hardware components (e.g., an analog circuit, a logic circuit, and the like) that are configured to perform functions described above and to be described below. Additionally or alternatively, the controller 2800 may include one or more processor cores. Functions of the controller 2800 described above and to be described below may be implemented with program code of software and/or firmware, and the processor core(s) of the controller 2800 may execute an instruction set of the program code. The processor core(s) of the controller 2800 may process various kinds of arithmetic operations and/or logical operations for the purpose of executing the instruction set.

The controller 2800 may include a sensor 2820 for measuring an internal temperature of the storage device 2400. For example, a thermoelectromotive force (or thermocouple) sensor using an electromotive force that varies with temperature, a thermal conductivity sensor sensing a value of a resistor that varies with temperature, and the like may be used as the sensor 2820. However, the inventive concepts are not limited thereto, and other types of temperature sensors may be used. The sensor 2820 may be configured to measure a temperature of a junction portion of the controller 2800 and the memory device 2600, and the measured temperature may be determined as an internal temperature of the storage device 2400. The sensor 2820 may measure a temperature at a junction portion between the controller 2800 and the memory device 2600.

Figure 3:
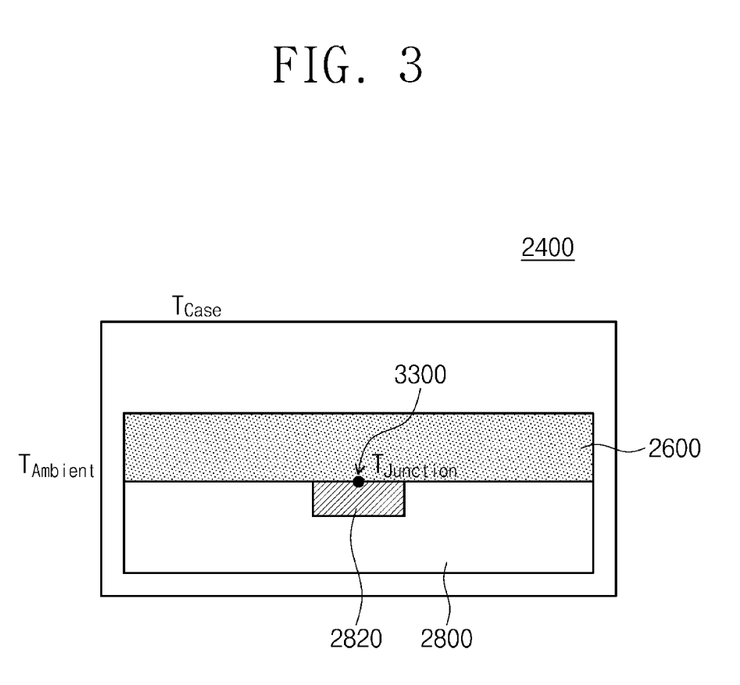
FIG. 3 illustrates a conceptual diagram for measuring an internal temperature of a storage device according to an embodiment of the inventive concepts.

Referring to FIG. 3, "$T_{Case}$" indicates a temperature of a case of the storage device 2400, and "$T_{Ambient}$" indicates a temperature of ambient air of (i.e., surrounding) the storage device 2400. The sensor 2820 may measure a temperature $T_{Junction}$ of a junction portion 3300 of the controller 2800 and the memory device 2600. "$T_{Junction}$" may be determined as an internal temperature of the storage device 2400. However, the manner in which the sensor 2820 measures the internal temperature of the storage device 2400 is not limited as here described.

Returning to FIG. 2, the controller 2800 may include registers 2840 (e.g., Reg #1, Reg #2, . . . Reg #n) for accelerating an operation. At least a part of the registers 2840 may be used to manage the reference temperature range to be applied to the storage device 2400. For example, at least one of the registers 2840 may be used to manage a value of the upper limit reference temperature of the storage device 2400. At least another of the registers 2840 may be used to manage a value of the lower limit reference temperature of the storage device 2400.

According to an embodiment, at least one of the registers 2840 may be used to determine whether to include temperature information in the command response 2900 to be transmitted to the host 2200. For example, the controller 2800 may include the temperature information in the command response 2900 when "1" is recorded in a relevant register and may not include the temperature information in the command response 2900 when "0" is recorded in a relevant register.

According to an embodiment, the command response 2900 may be bit data (e.g., a bit string). In this case, a bit value (e.g., a first bit value) indicating whether a temperature measured by the sensor 2820 is higher than the upper limit reference temperature may be recorded in a field 2920 of the command response 2900. For example, "1" may be recorded in the field 2920 when a temperature measured by the sensor 2820 is higher than the upper limit reference temperature, and "0" may be recorded in the field 2920 when the temperature measured by the sensor 2820 is not higher than the upper limit reference temperature. Also, a bit value (e.g., a second bit value) indicating whether a temperature measured by the sensor 2820 is lower than the lower limit reference temperature may be recorded in a field 2940 of the command response 2900. For example, "1" may be recorded in the field 2940 when a temperature measured by the sensor 2820 is lower than the lower limit reference temperature, and "0" may be recorded in the field 2940 when the temperature measured by the sensor 2820 is not lower than the lower limit reference temperature.

The host 2200 may perform a thermal throttling operation for controlling an internal temperature of the storage device 2400, based on the temperature information received from the storage device 2400.

The thermal throttling operation according to an embodiment may include an operation of cooling the storage device 2400.

Figure 4:
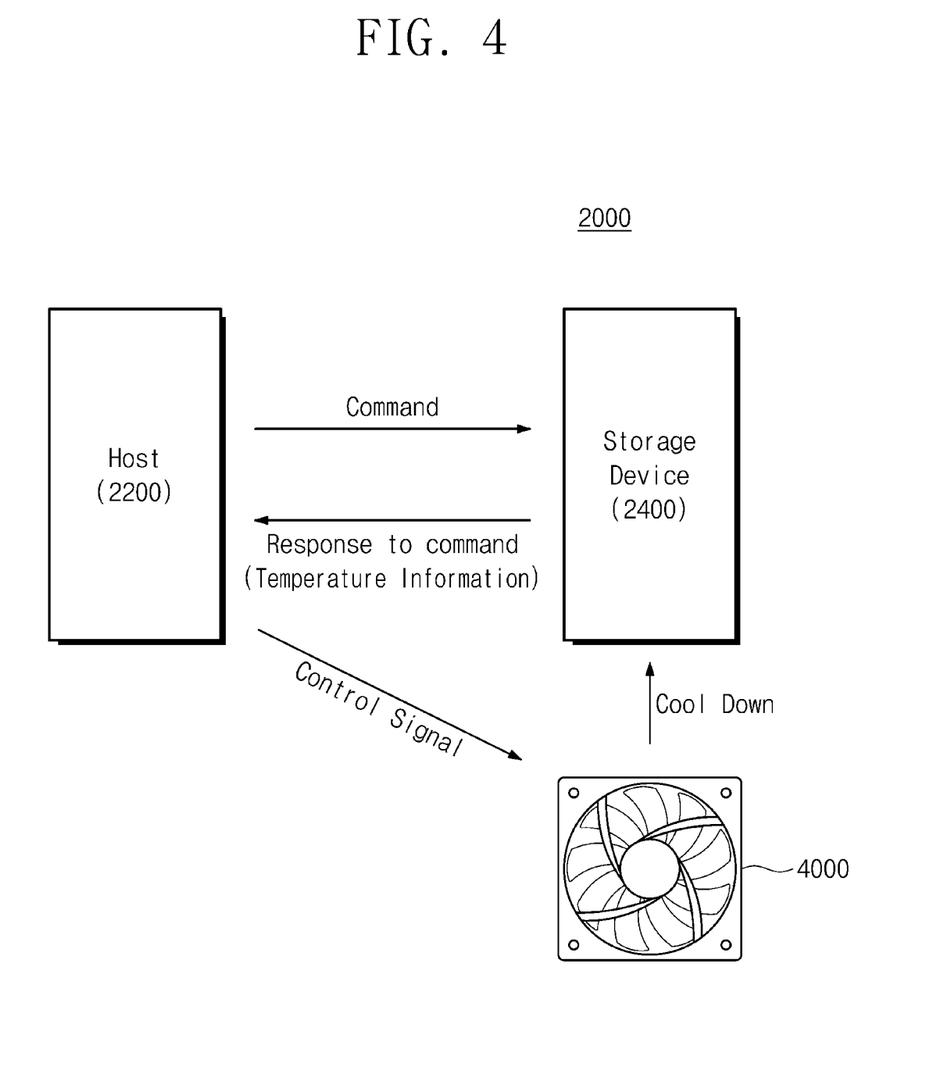
FIG. 4 illustrates a thermal throttling operation according to an embodiment of the inventive concepts.

FIG. 4 illustrates a thermal throttling operation according to an embodiment of the inventive concepts. Referring to FIG. 4, based on temperature information provided in the command response (2900) from the storage device 2400 indicative that a temperature measured by the sensor 2820 is higher than the upper limit reference temperature, the host 2200 may transmit a control signal to a cooler 4000 of the electronic device 2000, and the cooler 4000 receiving the control signal may cool the storage device 2400.

Figure 5:
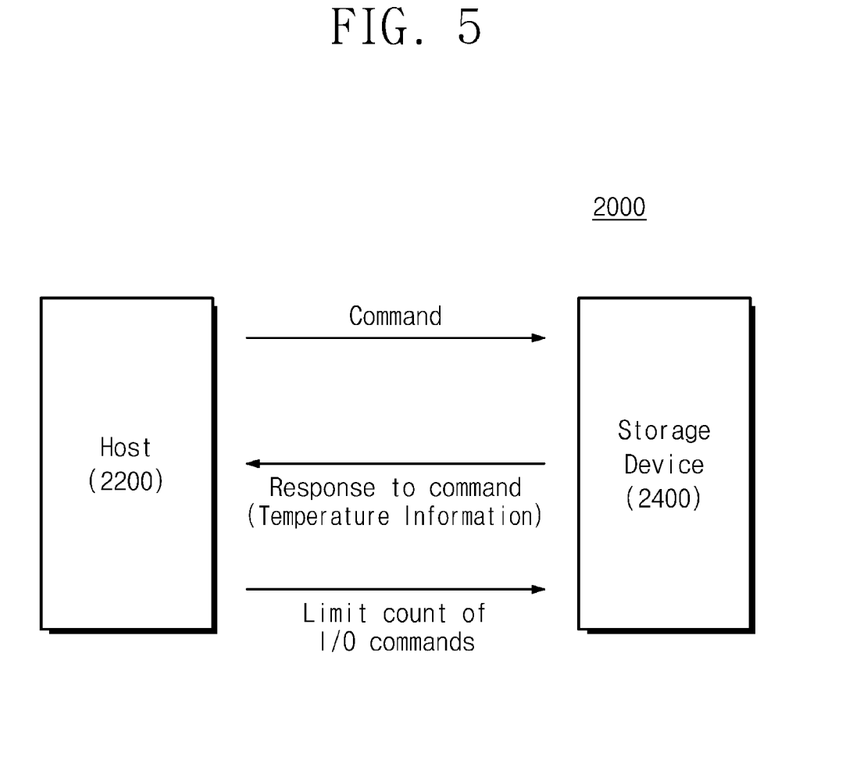
FIG. 5 illustrates a thermal throttling operation according to another embodiment of the inventive concepts.

The thermal throttling operation according to an embodiment may include an operation of adjusting the number of commands to be transmitted to the storage device 2400 from the host 2200.

FIG. 5 illustrates a thermal throttling operation according to an embodiment of the inventive concepts. Referring to FIG. 5, based on the command response (2900) from the storage device 2400 indicative that a temperature measured by the sensor 2820 is higher than the upper limit reference temperature, the host 2200 may reduce power consumption of the storage device 2400 by decreasing (i.e., limit) the number of input/output commands to be transmitted to the storage device 2400 during a reference time.

Figure 6:
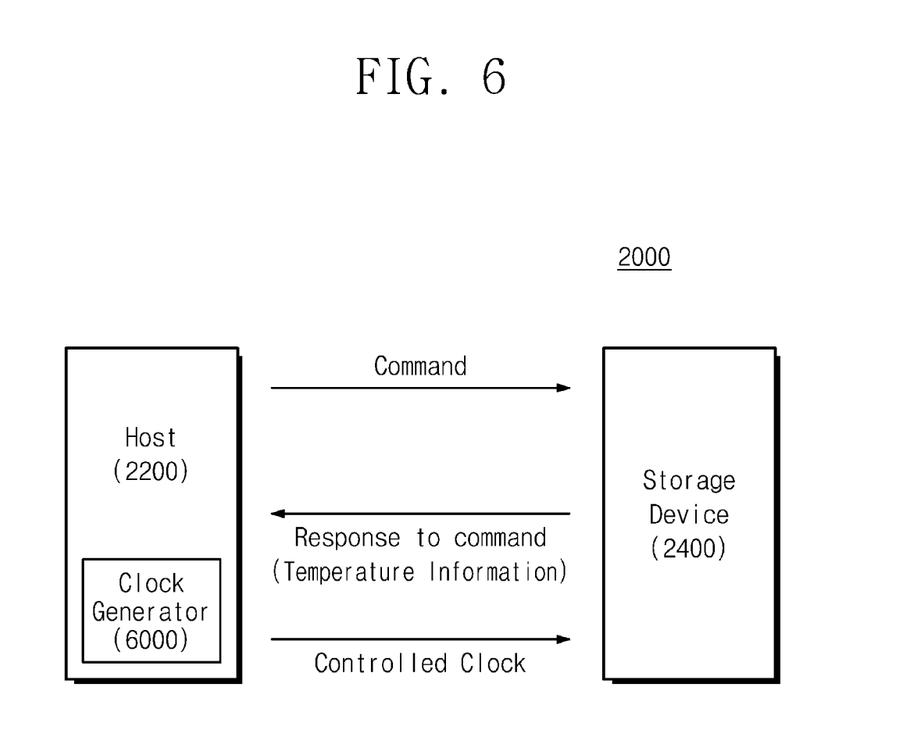
FIG. 6 illustrates a thermal throttling operation according to another embodiment of the inventive concepts.

The thermal throttling operation according to an embodiment may include an operation of adjusting a frequency of a driving clock to be applied to the storage device 2400. The driving clock may be a clock signal needed to drive the storage device 2400, and an internal temperature of the storage device 2400 may decrease as the frequency of the driving clock decreases. Alternatively, an internal temperature of the storage device 2400 may increase as the frequency of the driving clock increases.

FIG. 6 illustrates a thermal throttling operation according to an embodiment of the inventive concepts. Referring to FIG. 6, the host 2200 may transmit a control signal to a clock generator 6000, and the clock generator 6000 that receives the control signal may change the frequency of a driving clock (i.e., controlled clock) to be applied to the storage device 2400. For example, based on the command response (2900) from the storage device 2400 indicative that a temperature measured by the sensor 2820 is higher than the upper limit reference temperature, the host 200 may transmit the control signal to the clock generator 6000 to decrease the frequency of the driving clock to be applied to the storage device 2400. The clock generator 6000 is illustrated as being included in the host 2200, but the clock generator 6000 may be placed at another location in the storage device 2400 or the electronic device 2000.

It should be however understood that the thermal throttling operation may include any operation to be executed by the host 2200 for the purpose of adjusting the internal temperature of the storage device 2400 and is not limited to the above-described embodiments.

Figure 7:
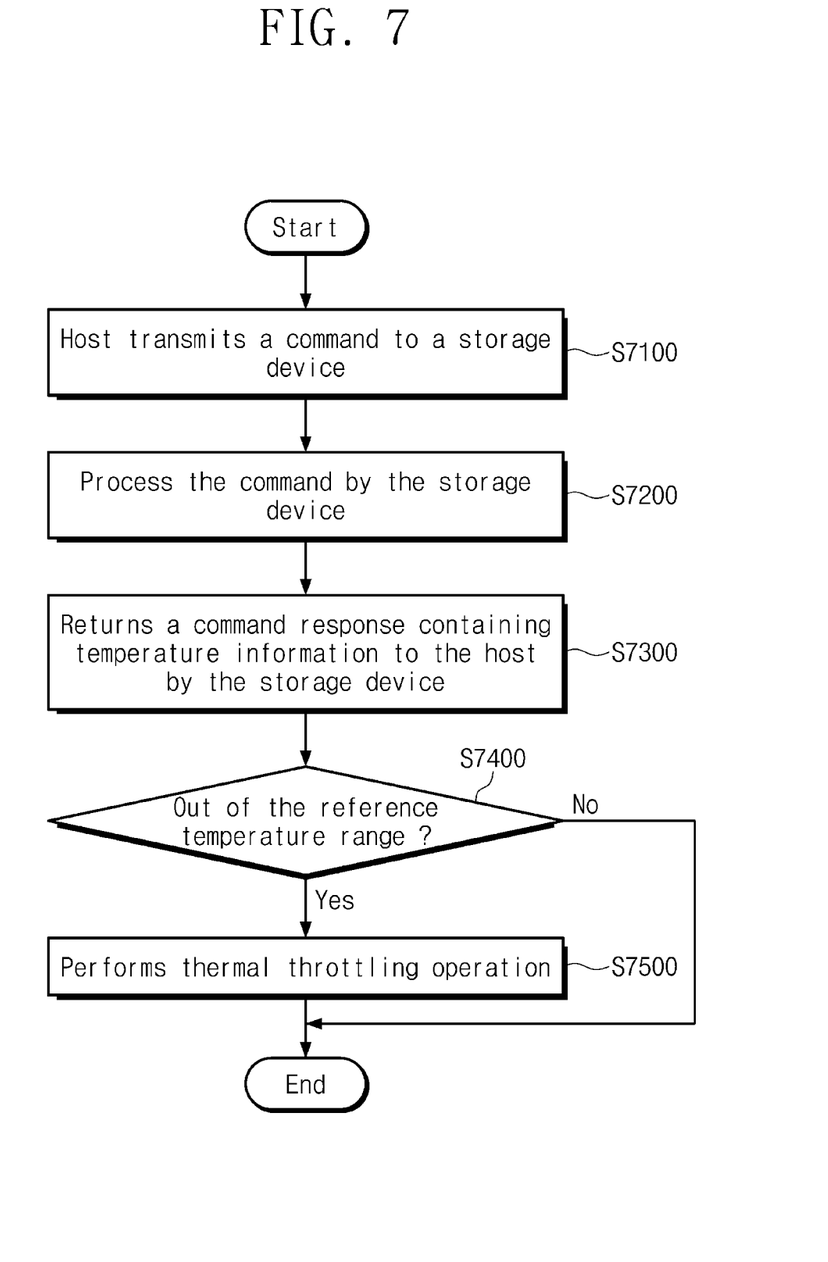
FIG. 7 illustrates a flowchart of a temperature control operation that the electronic device performs according to an embodiment of the inventive concepts.

FIG. 7 illustrates a flowchart of a temperature control operation that an electronic device performs according to an embodiment of the inventive concepts.

In operation S7100, the host 1200 may transmit a command associated with data to the storage device 1400. The command associated with the data may be, but is not limited to, a command for requesting the storage device 1400 to write data, a command for requesting the storage device 1400 to read data, or a command for requesting the storage device 1400 to delete data stored in the storage device 1400.

In operation S7200, the storage device 1400 may process the received command.

In operation S7300, the storage device 1400 may return a command response, in which temperature information is included, to the host 1200. According to an embodiment, the command response may include the result of processing the command and information about whether an internal temperature of the storage device 1400 is out of a reference temperature range.

In operation S7400, the host 1200 may determine whether there is a need to adjust a temperature of the storage device 1400, based on the temperature information received from the storage device 1400. For example, the host 1200 may determine whether the internal temperature of the storage device 1400 is out of the reference temperature range, with reference to a bit value recorded in a specific field of the command response received from the storage device 1400. If it is determined that the temperature of the storage device 1400 is out of the reference temperature range, in operation S7500, the thermal throttling operation may be performed.

In operation S7500, the host 1200 may perform the thermal throttling operation. For example, the host 1200 may cool the storage device 1400 using a cooler. Alternatively, the host 1200 may adjust the number of commands to be transmitted to the storage device 1400. Alternatively, the host 1200 may adjust a frequency of a driving clock to be applied to the storage device 1400.

Figure 8:
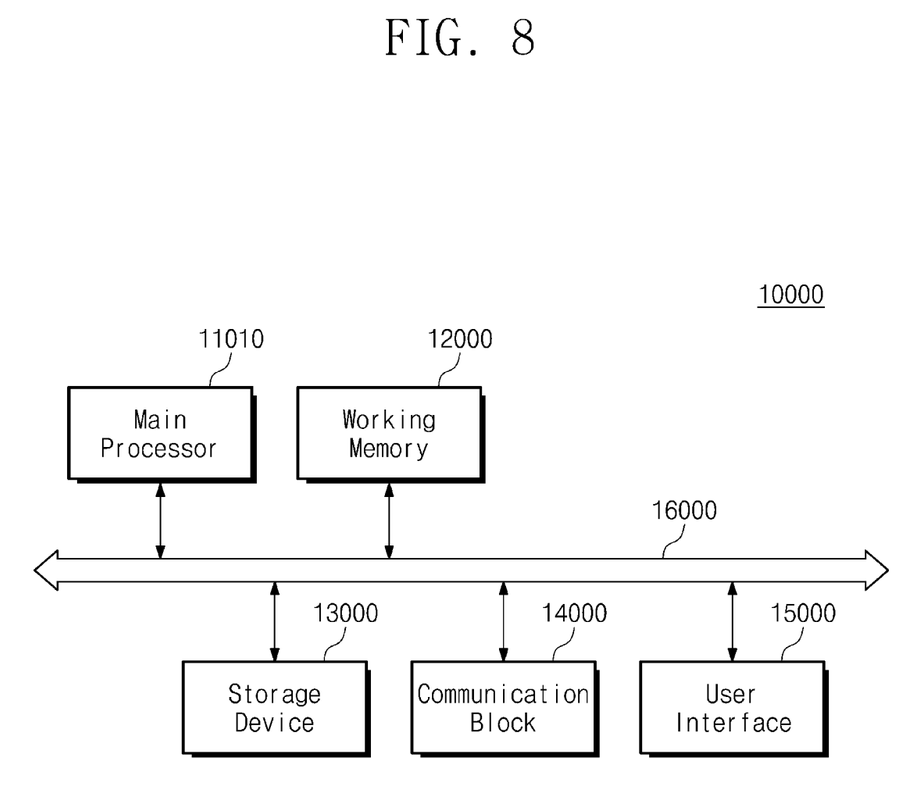
FIG. 8 illustrates a block diagram of an exemplary configuration of an electronic system including the electronic device according to an embodiment of the inventive concepts.

FIG. 8 illustrates a block diagram of an exemplary configuration of an electronic system including an electronic device according to an embodiment of the inventive concepts.

An electronic system 10000 may include a main processor 11010, a working memory 12000, a storage device 13000, a communication block 14000, a user interface 15000, and a bus 16000. For example, the electronic system 10000 may be one of electronic devices such as a desktop computer, a laptop computer, a tablet computer, a smartphone, a wearable device, a video game console, a workstation, a server, an infotainment device for vehicle, an advanced driver assistance systems (ADAS) device, and the like. The electronic system 10000 according to an embodiment may include any one of the electronic devices described above with reference to FIGS. 1 to 6. For example, the electronic system 10000 may include the electronic device 2000 of FIG. 2, but is not limited thereto.

The main processor 11010 may control overall operations of the electronic system 10000. The main processor 11010 may process various kinds of arithmetic operations and/or logical operations. To this end, the main processor 11010 may include a special-purpose logic circuit (e.g., field programmable gate arrays (FPGAs) or application specific integrated chips (ASICs)). For example, the main processor 11010 may include one or more processor cores and may be implemented with a general-purpose processor, a special-purpose processor, or an application processor.

The working memory 12000 may store data to be used for an operation of the electronic system 10000. For example, the working memory 12000 may temporarily store data that are processed or will be processed by the main processor 11010. For example, the working memory 12000 may include volatile memory, such as DRAM, SDRAM, or the like, and/or nonvolatile memory, such as PRAM, MRAM, ReRAM, FRAM, or the like.

The storage device 13000 may include at least one memory device and a controller. The memory device of the storage device 13000 may store data regardless of power supply. For example, the storage device 13000 may include non-volatile memory such as flash memory, PRAM, MRAM, a ReRAM, FRAM, or the like. For example, the storage device 13000 may include a storage medium such as a solid state drive (SSD), an embedded multimedia card (eMMC), universal flash storage (UFS), or the like.

The storage device 13000 may include a sensor for measuring an internal temperature of the storage device 13000. After processing a command received from the main processor 11010, the storage device 13000 may record (i.e., include) information about the internal temperature measured by the sensor in a command response to be returned to the main processor 11010.

For example, the storage device 13000 may receive a read command from the main processor 11010 and may return, to the main processor 11010, the command response indicating the result of processing the read command. The information about the internal temperature of the storage device 13000 may be additionally included in the command response. In this case, information about whether the read command is successfully performed, information about whether a temperature of the storage device 13000 is lower than the lower limit reference temperature, and information about whether a temperature of the storage device 13000 is higher than the upper limit reference temperature may be recorded in a response to the read command. The main processor 11010 may perform a thermal throttling operation for adjusting a temperature of the storage device 13000, based on the temperature information received from the storage device 13000.

The communication block 14000 may communicate with an external device/system of the electronic system 10000. For example, the communication block 14000 may support at least one of various wireless communication protocols such as long term evolution (LTE), worldwide interoperability for microwave access (WiMax), global system for mobile communication (GSM), code division multiple access (CDMA), Bluetooth, near field communication (NFC), and wireless fidelity (Wi-Fi), radio frequency identification (RFID) and/or at least one of various wired communication protocols such as transfer control protocol/Internet protocol (TCP/IP), universal serial bus (USB), and Firewire.

The user interface 15000 may perform communication arbitration between a user and the electronic system 10000. For example, the user interface 15000 may include input interfaces such as a keyboard, a mouse, a keypad, a button, a touch panel, a touch screen, a touch pad, a touch ball, a camera, a microphone, a gyroscope sensor, and a vibration sensor. For example, the user interface 15000 may include output interfaces such as a liquid crystal display (LCD) device, a light emitting diode (LED) display device, an organic LED (OLED) display device, an active matrix OLED (AMOLED) display device, a speaker, and a motor.

The bus 16000 may provide a communication path between the components of the electronic system 10000. The components of the electronic system 10000 may exchange data with each other based on a bus format of the bus 16000. For example, a bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

While the inventive concepts have been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. An electronic device, comprising:
   a storage device configured to receive a request from a host; and
   a sensor configured to measure a temperature of the storage device;
   wherein the storage device is configured to store a value of an upper limit temperature and a value of a lower limit temperature, and to output a value of a first single bit and a value of a second single bit to the host based on the request,
   wherein the storage device is further configured to set the value of the first single bit when a temperature of the storage device is higher than the upper limit temperature and to set the value of the second single bit when the temperature of the storage device is lower than the lower limit temperature, and
   wherein the storage device is configured to perform an operation of controlling the temperature based on a request received from the host responsive to at least one of the value of the first single bit and the value of the second single bit being set.

2. The electronic device of claim 1, wherein the storage device is configured to set the value of the first single bit to one when the temperature of the storage device is higher than the upper limit temperature, and configured to set the value of the second single bit to one when the temperature of the storage device is lower than the lower limit temperature.

3. The electronic device of claim 2, wherein the value of the first single bit is zero when the temperature of the storage device is not higher than the upper limit temperature, and the value of the second single bit is zero when the temperature of the storage device is not lower than the lower limit temperature.

4. The electronic device of claim 2, wherein the lower limit temperature is −40° C.

5. The electronic device of claim 3, wherein a temperature range defined by the lower limit temperature and the upper limit temperature includes −40° C. to 85° C.

6. The electronic device of claim 3, wherein a temperature range defined by the lower limit temperature and the upper limit temperature is compliant with a grade of the AEC (Automotive Electronics Council).

7. The electronic device of claim 6, wherein a temperature range defined by the lower limit temperature and the upper limit temperature is compliant with a grade 3 of the AEC (Automotive Electronics Council).

8. The electronic device of claim 3, wherein the storage device comprises:
   a first register configured to manage the value of the upper limit temperature; and
   a second register configured to manage the value of the lower limit temperature.

9. The electronic device of claim 3, wherein the storage device is cooled by throttling operation, based on information including the value of the first single bit that is output from the storage device.

10. The electronic device of claim 3, wherein the sensor is disposed inside the storage device.

11. The electronic device of claim 3, wherein the sensor is configured to sense the temperature of a case of the storage device.

12. The electronic device of claim 3, wherein the host is an application processor, and
wherein the storage device is one of an eMMC (Embedded MultiMediaCard), a Universal Flash Storage (UFS), and a Solid State Drive (SSD).

13. The electronic device of claim 3, wherein a temperature range defined by the lower limit temperature and the upper limit temperature is compliant with a grade of the AEC (Automotive Electronics Council),
wherein the storage device is cooled by throttling operation, based on information including the value of the first single bit that is output from the storage device, and
wherein the sensor is configured to sense the temperature of a case of the storage device.

14. The electronic device of claim 1, wherein the storage device is configured to encode and/or decode a signal and/or data processed in the storage device.

15. An electronic system, comprising:
a storage device configured to receive a request from a host;
a sensor configured to measure a temperature of the storage device;
a communication block configured to communicate with an external device; and
a bus configured to provide a communication path between the communication block and the storage device,
wherein the storage device is configured to store a value of an upper limit temperature and a value of a lower limit temperature, and to output a value of a first single bit and a value of a second single bit to the host in response to the request,
wherein the storage device is further configured to set the value of the first single bit when a temperature of the storage device is higher than the upper limit temperature and to set the value of the second single bit when the temperature of the storage device is lower than the lower limit temperature,
wherein the communication block is configured to support at least one wireless communication protocol, the at least one wireless communication protocol including at least one of long term evolution (LTE), global system for mobile communication (GSM), near field communication (NFC), wireless fidelity (Wi-Fi), radio frequency identification (RFID), transfer control protocol/ Internet protocol (TCP/IP) or universal serial bus (USB), and
wherein the storage device is configured to perform an operation of controlling the temperature based on a request received from the host responsive to at least one of the value of the first single bit and the value of the second single bit being set.

16. The electronic system of claim 15, wherein the storage device is configured to encode and/or decode a signal and/or data processed in the storage device.

17. The electronic system of claim 16, wherein a bus format of the bus includes at least one of universal serial bus (USB), small computer system interface (SCSI), peripheral component interconnect express (PCIe), advanced technology attachment (ATA), serial ATA (SATA), serial attached SCSI (SAS), integrated drive electronics (IDE), nonvolatile memory express (NVMe) or universal flash storage (UFS).

18. The electronic system of claim 16, wherein a temperature range defined by the lower limit temperature and the upper limit temperature includes −40° C. to 85° C.

19. The electronic system of claim 16, wherein a temperature range defined by the lower limit temperature and the upper limit temperature is compliant with a grade 3 of the AEC (Automotive Electronics Council).

20. The electronic system of claim 16, wherein the storage device is cooled by throttling operation, based on information including the value of the first single bit that is output from the storage device.

21. The electronic system of claim 15, wherein the storage device is configured to set the value of the first single bit to one when the temperature of the storage device is higher than the upper limit temperature, and configured to set the value of the second single bit to one when the temperature of the storage device is lower than the lower limit temperature.

22. The electronic system of claim 21, wherein the value of the first single bit is zero when the temperature of the storage device is not higher than the upper limit temperature, and the value of the second single bit is zero when the temperature of the storage device is not lower than the lower limit temperature.

* * * * *